United States Patent Office 3,540,933
Patented Nov. 17, 1970

3,540,933
REDOX FUEL CELL
Jan Boeke, 70 Monument St., Concord, Mass.
No Drawing. Filed July 11, 1967, Ser. No. 652,417
Int. Cl. H01m 27/26
U.S. Cl. 136—86
17 Claims

ABSTRACT OF THE DISCLOSURE

Anolyte and catholyte of same overall chemical composition for redox cell with simple porous separator therebetween and/or each including at least two metallic redox couple complexes. The composition includes metallic complexes having variable valency states (such as ions, oxides, sulphates, phosphates, nitrates, halogenides or other salts) in electrolyte solutions (such as acidic or ionic). Combinations of many complexes of metallic elements in Groups III, IV, V and VI of the Periodic Table having equilibrium potentials relatively close to each other (not more than 0.8 volt apart) are particularly effective in improving power generation. The portion of the electrolyte to be used for the anolyte is reduced by suitable chemical agents and that for the catholyte is oxidized. Suitable electrolyte solutions are acids, such as strong sulphuric or phosphoric acids. Measured amounts of anolyte and catholyte are mixed to have their chemical reaction provide the heat necessary to evaporate the end products resulting from the chemical conversion occurring in the cell. This provides a highly simple and effective means of eliminating waste products such as water.

CROSS-REFERENCE TO RELATED APPLICATION

The system described and claimed in copending application for U.S. Pat. Ser. No. 652,489, filed July 11, 1967, is advantageously used in conjunction with the invention in this present application.

BACKGROUND OF THE INVENTION

The invention relates to an electric current-producing cell having a positive and a negative electrode in separate electrode compartments joined by a permeable membrane or partition. The electrolyte or electrically conducting liquid filling the anode- or negative-electrode-compartmet is called anolyte, and that filling the positive-electrode- or cathode-compartment is called catholyte. In a redox type of such cell the electromotive force of the cell is derived from a redox couple in the electrolyte. A redox couple is an ionic species which can exist in two valency states: a reduced or red-form and an oxidized or oxform, which are mutually reversible depending upon external chemical or electrical conditions.

At the anode the redox couple oxidizes to its more electropostive form, giving off electrons to the anode and thus charging it negatively with regard to the electrolyte.

At the cathode another redox couple converts to its reduced or electronegative form, taking up electrons from the electrode and thus rendering it electrically positive with regard to the electrolyte.

The anolyte and the catholyte are brought into mutual electrical and material contact through a permeable or porous membrane or separating wall. The wall limits mixing or interdiffusion of the anolyte and catholyte which would destroy the electromotive force. This completes the electrical path inside the cell and electric current is drawn for power use from the oppositely charged electrodes until the anolyte is completely oxidized and the catholyte completely reduced.

Recharging of the cell is accomplished by chemically or electrically reducing the anolyte and oxidizing the catholyte. The oxidation can be achieved chemically with air, oxygen, hydrogen peroxide or other suitable oxidizers. The catholyte can be reduced chemically by hydrogen, hydrazine or organic reducers like methanol, which are usually called fuels. A redox cell, depending for the reduction of its catholyte upon a fuel, is usually called a redox fuel cell or chemically regenerative fuel cell.

An example of such a cell is described in the literature (A. M. Posner; Fuel 34 330 (1955)). It has as catholyte either the bromine-bromide or the chlorine-chloride redox couple, and as anolyte the stannic-stannous, or cupric-cuprous, or sulphate-sulphur dioxide redox couple.

In general the rule is statel (K. R. Williams: An Introduction to Fuel Cells; Elsevier N.Y. 1966; on p. 270) that an anode couple is required with a standard redox potential close to zero and a cathode couple with a standard redox potential close to 1.2 volts.

These recent examples are representative of the current state of the art in which it is believed imperative to utilize dissimilar anolyte and catholyte solutions, each based on a single redox couple and which are not permitted to mix or diffuse with each other. German Pat. 264,026 (1913) by W. Nernst describes a cell with more than one redox couple in a common electrolyte but its practical results were so poor that such an approach is presently rejected. Although it was not previously appreciated prior to this invention, the failure of the Nernst approach might be due to its lack of any form of separator to segregate anolyte and catholyte regions in the electrolyte and also its specification that the equilibrium potentials of its redox couples should be substantially more than one volt apart.

It is an object of the invention to provide a novel and improved electrolyte for a redox fuel cell.

It is another object of the invention to provide an electrolyte which can be suitably regenerated with a wide range of fuels, inorganic as well as organic, or by electro-reduction, without the use of solid noble metal catalysts.

SUMMARY

This invention uses an electrolyte having the same overall chemical composition for both anolyte and catholyte which are loosely segregated from each other by a simple porous separator and/or including at least two redox couple complexes of metallic elements in Groups III, IV, V, and VI of the Periodic System having equilibrium potentials not more than 0.8 volt apart from each other. One complex oxidizes at the anode and one reduces at the cathode to provide the required charge for current flow through the cell. The anolyte and catholyte are suitably prereduced and preoxidized before connection in circuit. When the overall chemical composition of the electrolyte in the cell is uniform, a simple porous separator can be used between anode- and cathode-spaces without having seepage, leakage, or diffusion through it upset the overall chemical composition or balance of the electrolyte.

Another advantage is, that measured amounts of catholyte and anolyte can be mixed to cause the chemical reaction of their Red- and Ox-forms to provide heat necessary to evaporate the end-products of the chemical conversion of the fuel used, thus preventing these products from accumulating in the electrolyte and impairing its functions.

Although theoretically one or two simple redox couples in a suitable supporting electrolyte should be effective, it has been found that such cannot simultaneously satisfy the technological requirements of providing useful cell current at, say, more than 1 milliampere per square centimeter of immersed geometrical electrode surface of a solid carbon electrode and without the use of solid metal catalysts and at a cell voltage of more than, say, 0.3 volt for power generation uses. As a matter of fact, prior studies have been so discouraging (L. G. Austin; R. D. Chamberlin and A. R. Schleicher: Final Report on Redox Fuel Cells: the Fuel Regenerator; U.S. Dept. Comm. Rept. AD 289, 559; 1962) that experimental work on redox fuel cells has virtually come to a standstill.

It has been surprisingly found, that a combination of at least two and preferably more suitable complexes having equilibrium potentials not more than 0.8 volt apart as measured in the sequence of an electromotive series, in a suitable supporting electrolyte, can break this low power output deadlock and produce anolytes which can readily be reduced with organic fuels without the use of solid or heterogeneous metal catalysts (which are expensive and subject to poisoning) contrary to the predictions of the cited report. Practical cell voltages of over 0.3 volt at current loads better than 1 ma./cm.$^2$ have been obtained by using these combination electrolytes—and by no means do they always have to contain in solution the noble metals. Also do these combination electrolytes work very well if compounded on the basis of phosphoric acid, which offers good electrical conductivity at excellent chemical and thermal stability, not being subject to evaporation losses, and facilitating the removal of fuel utilization end products by evaporation.

This invention can thus utilize an electrolyte on the basis of strong solutions in water of acids, such as sulphuric or phosphoric acid, in which are dissolved or suspended, the ions, oxides, sulphates, phosphates, nitrates, halogenides or other salts or complexes of at least two and preferably more of suitable metallic elements including: Ag; Au; Bi; Ce; Co; Cr; Cu; Fe; Ga; Ge; Hg; In; La and the lanthanides or rare earths, separately or combined; Mn; Mo; Ni; Pb; Pt and the platinum group metals, singly or combined; Se; Sb; Sn; Te; Ti; Th; Tl; U; V or W.

DESCRIPTION OF THE PREFERRED EMBODIMENTS

The following examples illustrate the preparation and use of the electrolyte of this invention.

Example I

A 60% solution of $H_3PO_4$ was boiled under reflux for several hours with an excess of ferric sulphate, cupric chloride, nickel sulphate, potassium chromate and ammonium vanadate, while dropwise adding methanol to keep the solution reduced. After cooling, the dark green liquid was decanted from the excess solid ingredients, and half of the liquid was oxidized with hydrogen peroxide, which turned the color a deep brown and generated a cloudy precipitate which was suspended in the liquid by stirring. The latter solution was used to fill the cathode space, and the former to fill the anode space of a cell where both sides were separated by a wall of porous ceramic material. Between the electrodes, made of essentially nonporous carbon or graphite, a voltage of 0.4 volt was measured at a current load of 5 ma./cm.$^2$ of anode area. After depletion, the anolyte was regenerated by boiling with methanol; the catholyte with hydrogen peroxide.

Example II

A 50% solution of phosphoric acid in water was boiled under reflux for several hours with an excess of ferric sulphate; cobaltic nitrate; antimonous oxide; tin sulphate; nickel sulphate; potassium chromate, vanadium oxide and potassium permanganate. A turbid dark brown liquid resulted which was decanted from the excess solids. Half of this liquid was boiled with methanol added dropwise until clear and dark green; and filled into the anode chamber of a cell. The former, brown liquid was filled into the cathode space. A porous siliceous wall separated both chambers. Between the essentially nonporous carbon or graphite electrodes in these chambers, a voltage of 0.8 volt was measured at a current load of about 10 ma./cm.$^2$. After depletion, the anolyte was regenerated by boiling with methanol; the catholyte by air bubbling through.

What is claimed is:

1. A redox fuel cell having an anode, an anode chamber, a cathode and a cathode chamber and containing a liquid electrolyte including more than two redox couples in said electrolyte with the equilibrium potentials of each redox couple not more than 0.8 volt apart from another redox couple in said electrolyte, said electrolyte having substantially uniform overall composition in said anolyte and catholyte chambers and having a simple separator between anolyte and catholyte chambers to limit mixing of analyte and catholyte, an external anolyte supply of electrolyte with the redox couples in a prereduced form and an external catholyte supply of electrolyte with the redox couples in a preoxidized form, the substantially uniform overall composition of the electrolyte serving to avoid interference by any mixing or diffusion of anolyte and catholyte with the effective operation of the cell.

2. A cell as set forth in claim 1 wherein said redox couples comprise metallic complexes.

3. A cell as set forth in claim 2 wherein said solution comprises a strong acid solution.

4. A cell as set forth in claim 3 wherein said acid comprises sulphuric acid.

5. A cell as set forth in claim 3 wherein said acid comprises phosphoric acid.

6. A cell as set forth in claim 3 wherein said electrolyte composition comprises a strong phosphoric acid solution, ferric sulphate, cupric chloride, nickel sulphate, potassium chromate and ammonium vanadate.

7. A cell as set forth in claim 6 wherein said catholyte comprises said composition to which hydrogen peroxide is added to oxidize it.

8. A cell as set forth in claim 6 wherein said anolyte comprises said composition to which methanol is added to reduce it.

9. A cell as set forth in claim 3 wherein said electrolyte composition comprises a strong phosphoric acid solution, ferric sulphate, cobaltic nitrate, antimonous oxide, tin sulphate, nickel sulphate, potassium chromate, vanadium oxide and potassium permanganate.

10. A redox fuel cell as set forth in claim 1 wherein said redox couples comprises complexes of elements from the group consisting of Co, Cr, Cu, Fe, Mn, Ni, Sb, Sn and V whereby voltage and power outputs of said cell are enhanced.

11. A cell as set forth in claim 10 wherein said solution comprises a strong acid solution.

12. A cell as set forth in claim 11 wherein said acid comprises sulphuric acid.

13. A cell as set forth in claim 11 wherein said acid comprises phosphoric acid.

14. A cell as set forth in claim 10 wherein said composition comprises a strong phosphoric acid solution, ferric sulphate, cupric chloride, nickel sulphate, potassium chromate and ammonium vanadate.

15. A cell as set forth in claim 14 wherein said catholyte comprises said composition to which hydrogen peroxide is added to oxidize it.

16. A cell as set forth in claim 14 wherein said anolyte comprises said composition to which methanol is added to reduce it.

17. A cell as set forth in claim 10 wherein said composition comprises a strong phosphoric acid solution, ferric sulphate, cobaltic nitrate, antimonous oxide, tin sulphate, nickel sulphate, potassium chromate, vanadium oxide, and potassium permanganate.

References Cited

UNITED STATES PATENTS 3,147,203  9/1964  Klass _____ 136—86 X
3,279,949  10/1966  Schaefer et al. _____ 136—86
3,360,401  12/1967  Grasselli et al. _____ 136—86

FOREIGN PATENTS 264,026  9/1913  Germany.

ALLEN B. CURTIS, Primary Examiner

U.S. Cl. X.R.

136—154, 155